United States Patent [19]
Liu

[11] 3,804,654
[45] Apr. 16, 1974

[54] MODELING COMPOSITION
[75] Inventor: Tien Liu, Cincinnati, Ohio
[73] Assignee: General Mills Fun Group, Inc., Minneapolis, Minn.
[22] Filed: Feb. 7, 1972
[21] Appl. No.: 224,232

[52] U.S. Cl.................. 106/134, 106/207, 106/137, 106/209
[51] Int. Cl. ........................ C08b 25/02, C08h 7/04
[58] Field of Search ......... 106/134, 137, 38.4, 38.5, 106/153, 207; 260/37 SB; 273/1

[56] References Cited
UNITED STATES PATENTS

| | | | |
|---|---|---|---|
| 3,689,437 | 9/1972 | McLaughlin | 106/137 |
| 3,183,108 | 5/1965 | Rhodenbaugh | 106/153 |
| 3,177,176 | 4/1965 | Boot | 260/37 SB |
| 3,382,150 | 5/1968 | Grass | 106/38.4 |
| 1,904,445 | 4/1933 | Gray | 106/137 |

OTHER PUBLICATIONS
Chem. Abst. 51: 6,046b, 1957. 6,046 b,

*Primary Examiner*—Theodore Morris
*Attorney, Agent, or Firm*—Anthony A. Juettner; Gene O. Enockson; Norman P. Friederichs

[57] ABSTRACT

A modeling composition is disclosed including mineral fillers such as clay and talc, hydrocarbon petroleum distillate oil, waxy paraffinic hydrocarbon oil, a liquid silicone compound, an astringent, a humectant, glue and water. The composition may be shaped and then permanently set.

6 Claims, No Drawings

MODELING COMPOSITION

The present invention relates to a plastic composition of a soft pliable, working consistency for being molded or modeled into any desired shape or form and then permanently set in such shape or form.

In the past, various plastic compositions have been provided which are reworkable over a long period of time. The use of such compositions has been a popular pastime of children for many years. One disadvantage of such known compositions has been that they may not be permanently set in a desired shape. In other words, a child may very carefully fashion an object from the modeling composition only to discover that the object is short lived due to the plastic nature of the modeling composition.

Attempts have been made in the past to provide modeling compositions that may be permanently set. No doubt the oldest modeling composition of this type is that of a kaoline-water mixture which is shaped and then fired such as in an oven. The fired clay is permanently set; however, the firing is not easily carried out with typical home facilities. Known clay materials are very dirty and stick to the hands and utensils. Moreover, care must be exercised in order to avoid burns in handling the object immediately following firing. Also the firing is a time consuming and technically difficult operation. Another approach has been a modeling compound that when exposed to the atmosphere over an extended period of time will permanently harden due to dehydration. This, too, is a time consuming operation and results in a very fragile object with poor handling characteristics.

The present invention provides a modeling composition that may be shaped as desired and then allowed to permanently set in such shape in a relatively short time such as 8 to 24 hours at room temperature. Moreover, the composition is clean, non-sticky, non-toxic and non-staining. Thus the present invention provides a modeling composition that is completely safe for use by children. The composition has superior strength, improved resistance to cracking and minimum shrinkage. The modeling composition of the present invention may be shaped in any of various ways such as by hand, forced into molds, extruded through a shaped orifice, pressed and decorated, or processed in any of an unlimited number of methods.

The present modeling composition includes mineral filler such as clay and talc, a hydrocarbon petroleum distillate oil, a waxy paraffinic hydrocarbon oil, a liquid silicone compound, aluminum sulfate or other astringents such as double salt alums, glycerin, glue and water.

The mineral filler is preferably present in an amount of about 65 percent. The mineral filler is preferably a mixture of clay and talc. The clay serves as filler or body of the composition and may be any of the clays conventionally used as modeling or molding clays. The preferred clay is a ball clay; however, various other clays may be used such as montmorillonite clay, china clay and various kaolin clays. The clay will be typically present in an amount of from about 20 to 52 percent, by weight (the terms "parts" and "percentages" as used herein will mean by weight unless otherwise indicated) and preferably about 45 percent.

The talc serves as a filler or body of the composition and gives good handling characteristics.

The term "talc" as used herein means finely powdered hydrous magnesium silicate. The talc may be present in an amount of from 13 to 45 percent, preferably about 21 percent. The combination of clay and talc may make up about 65 percent of the modeling composition.

The hydrocarbon petroleum distillate oil provides the composition with pliability prior to setting. The hydrocarbon petroleum distillate oil may be typified by kerosene and preferably but not necessarily kerosene which has been deodorized. Such a kerosene having an initial boiling point of approximately 250°F. to 400°F. is preferred. It is believed that the hydrocarbon distillate forms a thin film coating around the solid particles of clay and talc to give the composition a nice soft pliable texture until it is set up. The hydrocarbon distillate oil may be present in an amount of from 0.5 to 1.5 percent, preferably about 1 percent.

The waxy paraffinic hydrocarbon oil provides improved plasticity during forming and shaping. The waxy parafinic hydrocarbon oil also improves the clean handling characteristics of the composition. Any waxy paraffinic hydrocarbon oil may be used. The waxy paraffinic hydrocarbon oil may be present in an amount of from 0.5 to 1.5 percent, preferably about 1 percent. The pour point of the waxy paraffinic hydrocarbon may be about 10°F.

The silicone compound may be any of the non-toxic silicone oils that are used as mold release compounds. The silicone compound aids in making the modeling composition free from stickiness during shaping. The silicone compound may be dimethyl poly siloxane. The silicone compound may be present in an amount of from 0.4 to 0.9 percent, preferably about 0.7 percent.

The aluminum sulfate or other astringent is included for purposes of avoiding cracking of the composition as the composition sets. The aluminum sulfate may be present in an amount of from 1.5 to 2.0 percent, preferably about 1.8 percent. Any of various other astringents may be used such as the typical double salt alums.

The humectant may be glycerin and is typically present in an amount of from 0.9 to 1.3 percent, preferably about 1 percent. Any non-toxic humectant may be used such as propylene glycol or sorbitol. The humectant aids in the shelf stability of the composition.

The glue serves as a binder and is preferably a dextrine glue or a protein glue. The glue may be present in an amount of from 20 to 25 percent, preferably 21 percent. The water may be present in an amount of from 6.5 to 8 percent, preferably about 7 percent.

The composition may be prepared by mixing the filler, silicone compound and oils to form a first mixture. Then a second mixture is prepared including the sulfate, glue, glycerin and water. The two mixtures are then combined to provide the molding composition. The mixing may be carried out by hand or by use of any equipment that will provide an intimate mixing of the ingredients.

The following table illustrates the amount of the various ingredients that may be present in the modeling composition.

TABLE

| Ingredient | | |
|---|---|---|
| Clay | 20.0 to 52.0% | preferably 45.0% |
| Talc | 13.0 to 45.0% | preferably 21.0% |
| Glue | 20.0 to 25.0% | preferably 21.0% |
| Water | 6.5 to 8.0% | preferably 7.0% |
| Hydrocarbon petroleum distillate oil | 0.5 to 1.5% | preferably 1.0% |
| Waxy paraffinic hydrocarbon oil | 0.5 to 1.5% | preferably 1.0% |
| Aluminum sulfate | 1.5 to 2.0% | preferably 1.8% |
| Glycerin | 0.9 to 1.3% | preferably 1.0% |
| Dimethyl poly siloxane | 0.4 to 0.9% | preferably 0.7% |

The following example is illustrative of the present invention.

EXAMPLE

A setable molding composition was prepared according to the present invention by thoroughly mixing 200 parts clay[1], 100 parts talc[2], 5 parts of a waxy paraffinic hydrocarbon oil[3], 5 parts of a hydrocarbon petroleum distillate oil[4], and 3 parts silicone compound[5]. A second mixture was prepared including 5 parts glycerin, 8 parts aluminum sulfate, 97.5 parts dextrine glue and 32.5 parts water. The two mixtures were combined to provide the setable molding compound which was then shaped and permitted to set.

[1] The clay was Tennessee Ball Clay No. 10 and was of a particle size such that 100 percent passed through a number 60 mesh screen.

[2] The talc was Nytal Talc No. 100. The particular size was 20 percent finer than 3 micron and 81 percent finer than 50 micron.

[3] The waxy paraffinic hydrocarbon was Sunpar oil No. 106-H which has a pour point of about 10°F.

[4] The hydrocarbon petroleum distillate oil had a boiling point of 358°F.

[5] The silicone compound was a dimethyl poly siloxane prepared by Union Carbide under the designation Silicone Release L-45.

The embodiments of the invention in which an exclusive property or privilege is claimed are defined as follows:

1. A settable modeling composition consisting essentially of by weight 20 to 52 percent clay; 13 to 45 percent talc; 20 to 22 percent glue, said glue being a member of the group consisting of dextrine glue and protein glue; 6.5 to 8 percent water; 0.5 to 1.5 percent hydrocarbon petroleum distillate oil having a boiling point of from 250 to 400°F.; 0.5 to 1.5 percent waxy paraffinic hydrocarbon having a pour point of about 10°F.; 1.5 to 2 percent astringent; 0.9 to 1.3 percent of a member consisting of glycerin, propylene glycol and sorbitol and 0.4 to 0.9 percent non-toxic silicone oil.

2. The composition of claim 1 wherein the mixture of clay and talc comprises about 65 percent, by weight, of the composition.

3. The composition of claim 2 wherein the astringent is about 1.75 percent by weight of aluminum sulfate.

4. The composition of claim 1 wherein the composition includes, by weight:

| Ball Clay | 45% |
|---|---|
| Talc | 21% |
| Glue | 21% |
| Water | 7% |
| Hydrocarbon petroleum distillate oil | 1% |
| Waxy paraffinic hydrocarbon | 1% |
| Aluminum sulfate | 1.8% |
| Glycerin | 1.0% |
| Dimethyl poly siloxane | 0.7% |

5. The modeling composition of claim 1 wherein the silicone oil is dimethyl poly siloxane.

6. The composition of claim 5 wherein the distillate oil is kerosene, and wherein the astringent is aluminum sulfate.

* * * * *